United States Patent [19]

Fukui

[11] Patent Number: 4,855,327

[45] Date of Patent: Aug. 8, 1989

[54] PROCESS FOR PRODUCING PRE-EXPANDED PARTICLES OF POLYOLEFIN RESINS

[75] Inventor: Yoshiharu Fukui, Chiba, Japan

[73] Assignee: Sumitomo Chemical Co., Ltd., Osaka, Japan

[21] Appl. No.: 284,009

[22] Filed: Dec. 13, 1988

[30] Foreign Application Priority Data

Dec. 14, 1987 [JP] Japan .................... 62-316455

[51] Int. Cl.$^4$ ................................. C08J 9/22
[52] U.S. Cl. ........................... 521/58; 521/56; 521/60
[58] Field of Search ................ 521/58, 60, 56

[56] References Cited

U.S. PATENT DOCUMENTS 4,510,292 4/1985 Chiba et al. .................... 521/92
4,680,318 7/1987 Fujii et al. .................... 521/95

FOREIGN PATENT DOCUMENTS 2197683 8/1972 Fed. Rep. of Germany .
52-77174 6/1977 Japan .

*Primary Examiner*—Morton Foelak
*Attorney, Agent, or Firm*—Sughrue, Mion, Zinn, Macpeak & Seas

[57] ABSTRACT

A process for producing pre-expanded particles of a thermoplastic resin, wherein said particles are polyolefin resin particles which are obtained by polymerizing an olefin in the presence of a Ziegler-Natta catalyst, said polyolefin resin particles containing no more than 1% by weight of particles having a particle diameter of 105 μm or smaller and having a particle size distribution represented by equation:

$$R(Dp) = 100\exp[-(Dp/De)^n]$$

wherein Dp represents a particle diameter (μm) of polymer particles; R(Dp) represents a cummulative weight percentage; De represents an absolute size constant that is a particle diameter (μm) corresponding to R(Dp)=36.8% by weight; and n represents a distribution constant, in which De is 300 or more, and n is 2.5 or more. Pre-expanded polyolefin resin particles free from scatters of cell diameter or particle diameter and having a high expansion ratio can be obtained without using pelletized polymer particles or pulverized pellets of polymer particles. The pre-expanded polyolefin resin particles can be efficiently charged in a mold for expansion molding to easily provide a uniformly expanded article.

4 Claims, No Drawings

PROCESS FOR PRODUCING PRE-EXPANDED PARTICLES OF POLYOLEFIN RESINS

FIELD OF THE INVENTION

This invention relates to a process for producing pre-expanded particles of a polyolefin resin.

BACKGROUND OF THE INVENTION

It has hitherto been known that a thermoplastic resin composition is pre-expanded without inducing crosslinking by dispersing thermoplastic resin particles containing a volatile blowing agent in water while stirring in a pressure-resistant container, such as an autoclave, and releasing the dispersion into a lower pressure zone while being kept at a high temperature under a high pressure, as described in West German Patent Application (OLS) No. 2,107,683 and JP-B-56-1344. (The term "JP-B" as used herein means an "examined Japanese patent publication".)

Polystyrene can be obtained in the form of spherical resin particles by suspension polymerization, and pre-expanded particles prepared by using the polystyrene particles have a spherical form. On the other hand, pre-expanded particles of polyolefin resins, e.g., polyethylene and polypropylene, can be obtained by using uncrosslinked resin particles, whereas pre-expanded particles having a spherical form and a uniform cell diameter can hardly be obtained from pellets or pulverized pellets of polyolefin resins and, besides, the resulting pre-expanded particles show scatter of expansion ratio. Such irregular pre-expanded particles cannot be effectively charged in a mold, failing to obtain a uniformly expanded molded article. Therefore, there is room for further improvement in a process for producing pre-expanded particles of polyolefin resins.

SUMMARY OF THE INVENTION

One object of this invention is to provide a process for easily producing pre-expanded particles of high expansion ratio directly from polyolefin polymer particles without using pellets or pulverized pellets of the polymer particles.

Another object of this invention is to provide a process for producing pre-expanded particles of polyolefin resins which can be charged in a mold efficiently to easily provide a uniform expansion-molded article.

It has now been found that the above objects of this invention can be accomplished by using polyolefin resin particles having a specific size distribution.

The present invention relates to a process for producing pre-expanded particles of a thermoplastic resin, wherein said particles are polyolefin resin particles which are obtained by polymerizing an olefin using a Ziegler-Natta catalyst, contain no more than 1% by weight of particles having a particle diameter of 105 μm or smaller, and have a particle size distribution represented by equation:

$$R(Dp) = 100 \exp[-(Dp/De)^n]$$

wherein Dp represents a polymer particle diameter (μm); R(Dp) represents a residual cumulative weight percentage; De represents an absolute size constant that is a particle diameter (μm) corresponding to R(Dp)=36.8% by weight; and n represents a distribution constant, in which De is 300 or more and n is 2.5 or more.

In a preferred embodiment of the present invention, the process comprises dispersing the above-described polyolefin resin particles in a dispersing medium, heating the dispersion, and releasing the dispersion in a lower pressure zone, wherein said dispersing medium contains a phenolic antioxidant.

DETAILED DESCRIPTION OF THE INVENTION

The polyolefin resin particles which can be used in the present invention are particles obtained by polymerization of an olefin and do not contain 1% by weight or more, preferably 0.5% by weight or more, of particles having a diameter of 105 μm or smaller. Those polymer particles having a diameter of 105 μm or smaller are hardly expanded and therefore unfavorable.

Uniformly and spherically pre-expanded particles can be obtained by starting with the polyolefin polymer particles having a narrow particle size distribution. The size distribution of polymer particles is generally represented by Rosin-Rammler's distribution equation as described in *Funtai Kogaku Binran* "Handbook of Powder Technology", pp. 7–10, ed. by The Society of Powder Technology Japan:

$$R(Dp) = 100 \exp[-(Dp/De)^n]$$

wherein Dp represents a polymer particle diameter (μm); R(Dp) represents a cumulative weight percentage; De represents an absolute size constant that is a particle diameter (μm) corresponding to R(Dp)=36.8% by weight; and n represents a distribution constant (the smaller the n value, the broader the size distribution).

In the above equation, the polyolefin polymer particles to be used in the present invention should have De of 300 or more, preferably 400 or more, and n of 2.5 or more, preferably 3 or more. If the polymer particles have too a broad size distribution, there would unfavorably exist a distribution of expansion ratio among the resulting pre-expanded particles.

The polyolefin polymer particles to be used in the present invention can be produced by homo- or copolymerization of an olefin (e.g., ethylene, propylene, butene-1, pentene-1, hexene-1, 3-methylbutene-1, 4-methylpentene-1, octene-1, decene-1, octadecene-1, etc.) in the presence of a Ziegler-Natta catalyst by a gaseous phase process, a solvent process, a solvent-free liquid phase process, and the like. The polyolefin polymer particles preferably include linear low-density polyethylene, low-, medium- or high-density polyethylene, polypropylene, and polypropylene copolymers.

A Ziegler-Natta catalyst comprises a compound of a transition metal of Groups IV to VIII and an organometallic compound. Generally employed, transition metal compounds are Ti-containing compounds, Zr-containing compounds, and Cr-containing compounds. Particularly preferred catalysts comprise combinations of a Ti-containing compound and an organoaluminum compound. More preferred are high-activity catalysts comprising a titanium trichloride composition or a Ti-Mg-containing composition as a Ti-containing component. Processes for preparing these high-activity catalysts are not particularly restricted, and any of known techniques may be adopted as far as the catalyst enables to obtain the above-stated polymer particles.

Should the resulting polymer particles not satisfy the above-described requirements, they may be sieved to obtain fractions serving the purpose.

Pre-expansion of the polyolefin polymer particles can be carried out, for example, by a process in which the particles are placed in a closed container, and a volatile blowing agent is directly poured into the container to impregnate into the particles; or a process in which the particles are dispersed in a dispersing medium in a closed container with the aid of a small amount of a dispersing agent, and a volatile blowing agent is then impregnated into the particles.

The blowing agent which can be used in the present invention includes aliphatic hydrocarbons, e.g., propylene, butane, pentane, and hexane; alicyclic hydrocarbons, e.g., cyclopentane and cyclobutane; and halogenated hydrocarbons, e.g., trichloromonofluoromethane, dichlorodifluorometane, dichlorotetrafluoroethane, trichlorofluoroethane, methyl chloride, methylene chloride, and ethyl chloride. These blowing agents may be used either individually or in combination of two or more thereof. The amount of the blowing agent to be used is not particularly critical and can be selected appropriately depending on a desired degree of expansion, usually ranging from 5 to 50 parts by weight per 100 parts by weight of the polymer particles to be pre-expanded.

The dispersing agent to be used includes calcium tertiary phosphate, basic magnesium carbonate, basic zinc carbonate, calcium carbonate, etc.; and a small amount of a surface active agent, such as sodium dodecylbenzenesulfonate, sodium n-paraffinsulfonates, sodium α-olefinsulfonates, and the like.

The dispersing medium to be used may be any of solvents incapable of dissolving the polymer particles and includes, for example, water, ethylene glycol, glycerin, methanol, ethanol, and mixtures thereof, with water being usually preferred.

It is preferable to add at least one phenolic antioxidant to the dispersing medium so as to form uniform cells on pre-expansion. Specific examples of the phenolic antioxidant are 2,6-di-t-butyl-4-methylphenol, triethylene glycol-bis[3-(3-t-butyl-5-methyl-4-hydroxyphenyl)propionate], 1,6-hexanediol-bis[3-(3,5-di-t-butyl-4-hydroxyphenyl)propionate], pentaerythrityltetrakis[3-(3,5-di-t-butyl-4-hydroxyphenyl)propionate], 2,2-thiodiethylenebis[3-(3,5-di-t-butyl-4-hydroxyphenyl)propionate], octadecyl-3-(3,5-di-t-butyl-4-hydroxyphenyl)propionate, 2,2-thiobis(4-methyl-6-t-butylphenol), 1,3,5-trimethyl-2,4,6-tris(3,5-di-t-butyl-4-hydroxybenzyl)benzene, tris(3,5-di-t-butyl-4-hydroxybenzyl) isocyanurate, 4,4'-thiobis(3-methyl-6-t-butylphenol), 2,2-methylenebis(4-methyl-6-t-butylphenol), tris(2-methyl-4-hydroxy-5-t-butylphenyl)butane, 2,2'-ethylidenebis(4,6-di-t-butylphenol), 2-t-butyl-6-(3'-t-butyl-5'-methyl-2'-hydroxybenzyl)-4-methylphenyl acrylate, 3,9-bis[2-{3-(3-t-butyl-4-hydroxy-5-methylphenyl)propionyloxy}-1,1-dimethylethyl]-2,4,8,10-tetraoxaspiro[5.5]undecane, etc.

If desired, the dispersing medium may further contain other additives, such as phosphorus type antioxidants, sulfur type antioxidants, copper inhibitors, photostabilizers, ultraviolet absorbents, lubricants, metal fatty acid salts, nucleating agents, antistatic agents, and the like.

Specific examples of the phosphorus type antioxidants are trioctyl phosphite, trilauryl phosphite, tridecyl phosphite, tris(2,4-di-t-butylphenyl)phosphite, triphenyl phosphite, tris(nonylphenyl)phosphite, distearylpentaerythritol diphosphite, bis(2,4-di-t-butylphenyl)pentaerythritol diphosphite, bis(2,6-di-t-butyl-4-methylphenyl)pentaerythritol diphosphite, tris[4,4'-isopropylidenebis(2-t-butylphenol]phosphite, di(nonylphenyl)pentaerythritoldiphosphite, tetrakis(2,4-di-t-butylphenyl)-4,4'-biphenylene diphosphonite, etc.

Specific examples of the sulfur type antioxidants are dialkyl thiodipropionates (e.g., dilauryl thiodipropionate, dimyristyl thiodipropionate, and distearyl thiodipropionate), esters of alkylthiopropionic acids (e.g., butylthiopropionic acid, octylthiopropionic acid, laurylthiopropionic acid, and stearylthiopropionic acid) and polyhydric alcohols (e.g., glycerin, trimethylolethane, trimethylolpropane, pentaerythritol, trishydroxyethyl isocyanurate), such as pentaerythritol tetrakis(-dodecylthiopropionate).

Specific examples of the photostabilizers are bis(2,2,6,6-tetramethyl-4-piperidyl)sebacate, 4-benzoyloxy-2,2,6,6-tetramethylpiperidine, a polycondensate of succinic acid and N-(2-hydroxyethyl)-2,2,6,6-tetramethyl-4-hydroxypiperidine, 1,2,3,4-tetra(2,2,6,6-tetramethyl-4-piperidyl) butanetetracarboxylate, 1,4-di(2,2,6,6-tetramethyl-4-piperidyl)-2,3-butanedione, tris(2,2,6,6-tetramethyl-4-piperidyl) trimellitate, 1,2,2,6,6-pentamethyl-4-piperidyl stearate, 1,2,2,6,6-pentamethyl-4-piperidyl n-octoate, bis(1,2,2,6,6-pentamethyl-4-piperidyl) sebacate, tris(2,2,6,6-tetramethyl-4-piperidyl)nitrile acetate, 4-hydroxy-2,2,6,6-tetramethylpiperidine, 4-hydroxy-1,2,2,6,6-pentamethylpiperidine, poly[[(6-morpholino-s-triazin-2,4-diyl)[(2,2,6,6-tetramethyl-4-piperidyl)imino]hexamethylene[(2,2,6,6-tetramethyl-4-piperidyl)imino]], poly[[6(1,1,3,3-tetramethylbutyl)imino-1,3,5-triazin-2,4-diyl][[2,2,6,6-tetramethyl-4-piperidyl)imino]hexamethylene[(2,2,6,6-tetramethyl-4-piperidyl)imino]], a polycondensate of N,N'-bis(2,2,6,6-tetramethyl-4-piperidyl)hexamethylenediamine and 1,2-dibromoethane, etc.

Specific examples of the ultraviolet absorbents are hydroxybenzophenones, e.g., 2-hydroxy-4-methoxybenzophenone, 2-hydroxy-4-octoxybenzophenone, 2-hydroxy4-stearyloxybenzophenone, 2-hydroxy-4-dodecyloxybenzophenone, etc.; benzoates, e.g., phenyl salicylate, 2,4-di-t-butylphenyl 3',5'-di-t-butyl-4'-hydroxybenzoate, 4-octylphenyl 3,5-di-t-butyl-4-hydroxybenzoate, etc.; and benzotriazoles, e.g., 2-(2'-hydroxy-5'-methylphenyl)benzotriazole, 2-(2'-hydroxy-5'-t-butylphenyl)benzotriazole, 2-(2'-hydroxy-5'-octylphenyl)benzotriazole, 2-(2'-hydroxy-4'-octoxyphenyl)benzotriazole, 2-(2'-hydroxy-3',5'-di-t-butylphenyl)benzotriazole, 2-(2'-hydroxy-3',5'-di-t-amylphenyl)benzotriazole, 2-(2'-hydroxy-3'-t-butyl-5'-methylphenyl)-5-chlorobenzotriazole, 2-(2'-hydroxy-3',5'-di-t-butylphenyl)-5-chlorobenzotriazole, etc.

Specific examples of the lubricants are lauramide, palmitamide, stearamide, behenamide, erucamide, oleamide, methylenebisbehenamide, methylenebisstearamide, methylenebisoleamide, ethylenebisstearamide, ethylenebisoleamide, hexamethylenebisstearamide, N-stearylerucamide, etc.

Specific examples of the metal fatty acid salts are magnesium stearate, calcium stearate, zinc stearate, etc. Calcium hydroxide, hydrotalcite, etc. may be used in substitution therefor.

The nucleating agents include sodium salts, aluminum salts, phosphorus nucleating agents, sorbitol nucleating agents, etc. The antioxidants are not particularly limited, and those commonly employed for polyolefins are employable.

The phenolic antioxidant and other additives are added to the dispersing medium in an amount of from 0.001 to 5 parts by weight, preferably from 0.003 to 1 part by weight, more preferably from 0.01 to 1 part by weight, per 100 parts by weight of the polyolefin polymer particles.

After the polyolefin polymer particles are dispersed in a dispersion medium having incorporated therein a volatile blowing agent and other additives, the dispersion is heated to a temperature above the softening point of the polyolefin polymer particles. The heating temperature is appropriately selected from a range within which the particles can be expanded without collapse of cells, usually ranging from 25° C. lower than the melting point of the polymer particles to 10° C. higher than the melting point of the polymer particles. Upon heating, the volatile blowing agent is impregnated into the polymer particles.

Then, the inner pressure is set at a pressure no less than the vapor pressure of the volatile blowing agent, and while keeping the inner pressure at that level, an opening of the container is opened to let off the dispersion into a lower pressure atmosphere to thereby pre-expand the olefin resin particles.

The polyolefin resin pre-expanded particles usually have closed cells in a proportion of 80% or more. If desired, the pre-expanded particles may be aged for a given period of time. The resulting pre-expanded particles can be charged in a mold and expansion-molded by steam-heating to obtain an expansion-molded article. The thus produced article shows a small percentage of dimensional shrinkage and a small distortion and therefore has an extremely heightened commercial value.

The present invention is now illustrated in greater detail by referring to Examples and Comparative Examples, but it should be understood that the present invention is not deemed to be limited thereto. In these examples, all the percents and parts are by weight unless otherwise indicated.

Particle size distributions of polymer particles prepared in these examples were determined by the following sieve analysis.

A sample weighing 200 g was loaded on a sieve having a sieved opening of 105 μm, 125 μm, 177 μm, 250 μm, 297 μm, 350 μm, 420 μm, 500 μm, 590 μm, 710 μm, or 1190 μm, and sieved for 10 minutes by means of a shifting machine. The residue on the sieve was weighed, and the absolute size constant De and distribution constant n were obtained by using a Rosin-Rammler chart.

EXAMPLE 1

(1) Synthesis of Titanium Trichloride

Titanium trichloride was synthesized in accordance with the process disclosed in JP-A-47-34478 (the term "JP-A" as used herein means an "unexamined published Japanese patent application") as follows.

Brown titanium trichloride obtained by reduction of titanium tetrachloride with diethylaluminum chloride in an inert solvent was treated with an approximately equimolar amount of diisoamyl ether at room temperature and then chemically treated with a hexane solution of titanium tetrachloride at 65° C.

(2) Synthesis of Polypropylene Polymer

In a 300 l-volume autoclave equipped with a stirrer and purged with nitrogen was charged 150 l of heptane. Then, 1.5 g of titanium trichloride and 10 times the molar amount of diethylaluminum chloride were added thereto. The mixture was heated to 60° C., and propylene, ethylene, and hydrogen were fed thereto to effect polymerization for 15 hours while maintaining the gaseous phase concentrations constant by gas chromatography. The unreacted gases were purged out of the system, and the resulting polymer slurry was withdrawn into a washing tank. Into the tank was poured 40 l of methanol, followed by stirring at 60° C. for 1 hour to decompose the catalyst. Further was poured 100 l of water, followed by stirring for 30 minutes. The mixture was subjected to centrifugation, and the solid was dried in a drier to obtain polymer particles.

The resulting polypropylene polymer particles had an intrinsic viscosity $[\eta]$ of 1.70 as measured in tetralin at 135° C. and an ethylene content of 4.5%. The particle size distribution of the polymer particles had an absolute size constant De of 750 and a distribution constant n of 10. The proportion of particles having a diameter of 105 μm or smaller was found to be 0.03%.

(3) Production of Pre-Expanded Particles

In a 5 l-volume autoclave were charged 1,000 g of the polymer particles prepared in (2) above, 350 g of dichlorofluoromethane, 5 g of basic calcium tertiary phosphate and 0.06 g of sodium n-paraffinsulfonate as dispersing agents, and 3,000 g of water, and the mixture was heated to 137° C. While introducing dichlorodifluoromethane into the autoclave to keep the inner pressure constant, the aqueous dispersion in the autoclave was released by opening a valve at the bottom of the autoclave into the atmosphere to effect pre-expansion. The resulting pre-expanded particles were determined for expansion ratio and scatters of particle size, form and cell diameter. The results obtained are shown in Table 1.

When the pre-expanded particles were charged in a mold, heated and expanded, the resulting expansion-molded article was substantially free from distortion.

COMPARATIVE EXAMPLE 1

Polypropylene polymer particles were prepared in the same manner as in Example 1-(2), except for replacing the titanium trichloride as used in Example 1-(2) with AA type titanium trichloride produced by Toho Titanium Co., Ltd.

The resulting polypropylene polymer particles had an $[\eta]$ of 1.72 and an ethylene content of 4.4%. The absolute size constant De and distribution constant n of the particle size distribution were 600 and 1.1, respectively. The proportion of particles having a diameter of 105 μm or smaller was 12%.

The polymer particles were pre-expanded in the same manner as in Example 1-(3). The results obtained are shown in Table 1.

EXAMPLE 2

In a 5 l-volume autoclave were charged 1000 g of the same polymer particles as prepared in Example 1-(2), 350 g of dichlorodifluoromethane, 5 g of basic calcium tertiary phosphate, 0.06 g of sodium n-paraffinsulfonate, 0.2 g of 2,6-di-t-butyl-4-methylphenol, 0 15 g of tetrakis[methylene-3-(3',5'-di-t-butyl-4-hydroxyphenyl)-propionate]methane, and 3,000 g of water. The mixture was heated to 137° C. and then pre-expanded in the same manner as in Example 1-(3). The results obtained are shown in Table 1.

EXAMPLE 3

(1) Synthesis of Solid Catalyst

A solid catalyst was synthesized in accordance with the process disclosed in JP-A-60-228504 as follows.

Tetra-n-butoxytitanium was reduced with ethylaluminum sesquichloride in n-heptane. To the resulting reddish brown solid product was added triethylaluminum, and ethylene was preliminarily polymerized (amount of the preliminary polymer was 0.1 g per gram of the solid product). Then, the product was treated with an equimolar amount of diisoamyl ether at 30° C., and titanium tetrachloride was added thereto, followed by further treating at 75° C. to obtain a solid catalyst.

(2) Synthesis of Polypropylene Polymer Particles

Polymerization was carried out in the same manner as in Example 1-(2), except for using the titanium trichloride catalyst as prepared in (1) above. The resulting polypropylene polymer particles had an [η] of 1.71 and an ethylene content of 4.4%. The absolute size constant De and distribution constant n were 900 and 12, respectively. The proportion of particles having a diameter of 105 μm or smaller was 0.02%. The polymer particles were pre-expanded in the same manner as in Example 1-(3). The results obtained are shown in Table 1.

EXAMPLE 4

(1) Synthesis of Solid Catalyst

A solid catalyst was synthesized in accordance with the process disclosed in JP-A-61-218606 as follows.

n-Butylmagnesium chloride was added dropwise to an n-heptane solution containing 1 part of tetrabutoxytitanium and 17 parts of tetraethoxysilane to obtain a brown solid product. The product was treated with a toluene solution of diisobutyl phthalate at 80° C. and then with a toluene solution of n-butyl ether and titanium tetrachloride at 95° C. to obtain a solid catalyst.

(2) Synthesis of Polypropylene Polymer Particles

In a 300 l-volume autoclave equipped with a stirrer and having been purged with nitrogen was charged 150 l of heptane, and 0.5 g of the solid catalyst as prepared in (1) above, 57 mmols of triethylaluminum, and 57 mmols of phenyltriethoxysilane were added thereto. Propylene, ethylene, and hydrogen were then fed thereto to effect polymerization at 60° C. for 10 hours to obtain polypropylene polymer particles.

The resulting polymer particles had an [η] of 1.70 and an ethylene content of 4.5%. The absolute size constant De and distribution constant n were 950 and 10, respectively. The proportion of particles having a diameter of 105 μm or smaller was 0.01%.

The polymer particles were pre-expanded in the same manner as in Example 1-(3). The results obtained are shown in Table 1.

COMPARATIVE EXAMPLE 2

Pre-expanded particles were obtained in the same manner as in Comparative Example 1, except that 0.2 g of 2,6-di-t-butyl-methylphenol and 0.15 g of tetrakis[methylene-3-(3',5'-di-t-butyl-4-hydroxyphenyl)propionate]methane were further added to the mixture to be pre-expanded. The results obtained are shown in Table 1.

COMPARATIVE EXAMPLE 3

Polypropylene polymer particles were obtained in the same manner as in Example 1-(2), except that polymerization was carried out for 30 minutes. The resulting polymer particles had an [η] of 1.72 and an ethylene content of 4.5%. The absolute size content De and distribution constant n were 260 and 9, respectively. The proportion of particles having a diameter of 105 μm or smaller was 0.3%.

The polymer particles were pre-expanded in the same manner as in Example 1-(3). The results obtained are shown in Table 1.

TABLE 1

| Example No. | Pre-Expansion Ratio | Scatter of Pre-Expanded Particle Size | Form of Pre-Expanded Particles | Scatter of Cell Diameter* |
| --- | --- | --- | --- | --- |
| Example 1 | About 8 | small | spherical | fair |
| Example 2 | about 8 | " | " | good |
| Example 3 | about 13 | " | " | " |
| Example 4 | about 15 | " | " | " |
| Comparative Example 1 | about 4 | large | amorphous | bad |
| Example 2 | about 4 | " | " | " |
| Example 3 | no-substantial expansion | — | — | — |

Note:
*Each of 20 pre-expanded particles per sample was vertically cut at the center, and the cut surface was observed under 50 × magnification.
The scatter of the cell diameter was evaluated according to the following rating system:
Good No substantial scatter was observed among particles or within individual particles.
Fair Slight scatter was observed among particles or within individual particles
Bad Scatter was observed among particles or within individual particles As described above, the process according to the present invention provides pre-expanded resin particles free from scatters of cell diameter or particle diameter without using pelletized polymer particles or pulverized pellets of polymer particles. Thus, the present invention makes it possible to easily obtain pre-expanded particles of high expansion ratio directly from polyolefin polymer particles, which can be efficiently charged in a mold for expansion molding to easily provide a uniform expanded article.

While the invention has been described in detail and with reference to specific embodiments thereof, it will be apparent to one skilled in the art that various changes and modifications can be made therein without departing from the spirit and scope thereof.

What is claimed is:

1. A process for producing pre-expanded particles of a thermoplastic resin, wherein said particles are polyolefin resin particles which are obtained by polymerizing an olefin in the presence of a Ziegler-Natta catalyst, said polyolefin resin particles containing no more than 1% by weight of particles having a particle diameter of 105 μm or smaller and having a particle size distribution represented by equation:

$$R(Dp) = 100 exp[-(Dp/De)^n]$$

wherein Dp represents a polymer particle diameter (μm); R(Dp) represents a residual cumulative weight percentage; De represents an absolute size constant that is a particle diameter (μm) corresponding to R(Dp)=36.8% by weight; and n represents a distribution constant, in which De is 300 or more, and n is 2.5 or more, and said process comprises dispersing said polyolefin resin particles in a dispersing medium containing a blowing agent and from 0.001 to 5 parts by weight of a phenolic antioxidant per 100 parts by weight of the polyolefin polymer particles, heating the dispersion, and releasing the dispersion in a lower pressure zone.

2. A process as claimed in claim 1, wherein said polyolefin resin particles contains no more than 0.5% by weight of particles having a particle diameter of 105 μm or smaller.

3. A process as claimed in claim 1, wherein De is 400 or more, and n is 3 or more.

4. A process as claimed in claim 1, wherein said polyolefin resin particles are particles of linear low-density polyethylene, low-, medium- or high-density polyethylene, polypropylene or a propylene copolymer.

* * * * *